(12) United States Patent
Wang

(10) Patent No.: US 7,422,730 B2
(45) Date of Patent: Sep. 9, 2008

(54) NANOPOROUS ULTRAFINE α-ALUMINA POWDERS AND SOL-GEL PROCESS OF PREPARING SAME

(75) Inventor: Yuhu Wang, Littleton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 351 days.

(21) Appl. No.: 10/406,085

(22) Filed: Apr. 2, 2003

(65) Prior Publication Data

US 2004/0197263 A1    Oct. 7, 2004

(51) Int. Cl.
C01F 7/02 (2006.01)
C01F 7/04 (2006.01)

(52) U.S. Cl. .................. 423/111; 423/625; 423/630; 423/631; 977/773; 977/777; 977/811

(58) Field of Classification Search .............. 423/625, 423/630, 631, 111; 977/773, 777, 811
See application file for complete search history.

(56) References Cited

U.S. PATENT DOCUMENTS

| | | | |
|---|---|---|---|
| 4,915,710 A * | 4/1990 | Miyazaki et al. .............. 51/309 |
| 5,389,352 A | 2/1995 | Wang |
| 6,258,137 B1 | 7/2001 | Garg et al. |
| 6,461,584 B1 * | 10/2002 | Wen et al. ................... 423/625 |
| 6,521,203 B1 * | 2/2003 | Mohri et al. ................ 423/625 |
| 6,752,692 B2 * | 6/2004 | Wada et al. ..................... 451/8 |
| 6,841,497 B1 | 1/2005 | Krell et al. |
| 2002/0052288 A1 | 5/2002 | Krell et al. |
| 2003/0098529 A1 | 5/2003 | Drumm et al. |
| 2003/0185746 A1 * | 10/2003 | Kajihara et al. ............ 423/625 |
| 2005/0008565 A1 * | 1/2005 | Maki et al. .................. 423/625 |
| 2005/0135995 A1 * | 6/2005 | Wang ......................... 423/625 |
| 2005/0214201 A1 * | 9/2005 | Maruno et al. .............. 423/625 |

FOREIGN PATENT DOCUMENTS

| WO | WO-00/69790 | 11/2000 |
|---|---|---|
| WO | WO 00/69790 | 11/2000 |
| WO | WO-01/25366 A1 | 4/2001 |
| WO | WO-01/36554 A1 | 5/2001 |
| WO | WO-02/081124 A1 | 10/2002 |
| WO | WO 03/044122 | 5/2003 |

OTHER PUBLICATIONS

Janbey, A. et al., "A new chemical route for the synthesis of nano-cryastalline Al₂O₃ powder," J. of the European Ceramic Society 21 (2001) 2285-2289.
Zeng, W.M., et al., "A New Sol-Gel Route Using Inorganic Salt Of Synthesis Al₂O₃ Nanopowders," NanoStructured MAterials, vol. 10, No. 4 (1998) 542-550.
Rajendran, S., "Production of ultrafine alpha alumina powders and fabrication of fine grained strong ceramics," J. of MAterials Science 29 (1994) 5664-5672.
Janbey et al., "A new chemical route for the synthesis of nano-crystalline α-Al₂O₃ powder," *Journal of the European Ceramic Society* vol. 21, pp. 2285-2289 (2001).
Rajendran, "Production of ultrafine alpha alumina powders and fabrication of fine grained strong ceramics," *Journal of Materials Science* vol. 29, pp. 5664-5672 (1994).
Zeng et al., "A New Sol-Gel Route Using Inorganic Salt For Synthesizing Al₂O₃ Nanopowders," *NanoStructured Materials* vol. 10(4), pp. 543-550 (1998).
Kamiya et al., "Formation of α-Alumina Around 500°C. in Alkoxy-Derived Alumina Gels Under Ambient Pressure-Effects of Starting Solution Composition and Seeding," Journal of Sol-Gel Science and Technology 20:275-285 (2001).
Ma et al., "Synthesis and Processing of Nano-α-Al₂O₃ Powders," Key Engineering Materials, Aedermannsdorf, vol. 206-213:43-46 (2001).

* cited by examiner

Primary Examiner—Timothy C Vanoy
(74) Attorney, Agent, or Firm—Edwards Angell Palmer & Dodge LLP; Peter F. Corless; Lisa Swiszcz Hazzard

(57) ABSTRACT

The present invention provides α-alumina powders comprising α-alumina particles of which at least 80% of the α-alumina particles have a particle size of less than 100 nm. The invention also provides slurries, particularly aqueous slurries, which comprise α-alumina powders of the invention. The invention further provides methods of manufacturing α-alumina powders and α-alumina slurries of the invention and methods of polishing using same.

35 Claims, 1 Drawing Sheet

NANOPOROUS ULTRAFINE α-ALUMINA POWDERS AND SOL-GEL PROCESS OF PREPARING SAME

FIELD OF THE INVENTION

The present invention relates to nanosized α-alumina particles and methods of making same and more particularly to nanosized α-alumina particles having an average particle size of less than about 100 nm. The present invention also relates to chemical mechanical polishing compositions (CMP) comprising α-alumina particles of the invention and CMP polishing methods using same.

BACKGROUND OF THE INVENTION

Ultra-fine alumina (aluminum oxide) powder is one of the most widely used ceramic materials in a variety of industries. Applications of fine alumina powders include use as abrasives for polishing semiconductor and precision optical components, catalyst supports including the support structure in automobile catalytic converters, fillers for polymers, and pigment for painting, and the like. Alumina has over twelve (12) different crystalline phases, each of which has a different lattice structure and physical properties. However, the most well known and commonly used alumina powders are γ-alumina and α-alumina. The low temperature phase, γ-alumina, is thermodynamically metastable and transforms to the thermodynamically stable phase, α-alumina, at temperatures in excess of about 1100° C. or about 1200° C. depending on various conditions. With a defective spinel structure, γ-alumina powder can have very small particle sizes, e.g., particle sizes of less than about 20 nm, and extremely high surface area, e.g., greater than about 300 m$^2$/g. Moreover, γ-alumina can be processed via both vapor and liquid phase processing techniques. Ultrafine γ-alumina having an average particle size of less than 40 nm and a polishing slurry with γ-alumina are commercially available.

The density of α-alumina is about 20% higher than the density of γ-alumina and more chemically and mechanically durable than γ-alumina. Thus, nanosized α-alumina particles should be suitable for a greater range of applications than nanosized γ-alumina. However, during the phase transformation, due to the reorganization of oxygen in the crystal lattice, the alumina particle size increases drastically such that α-alumina prepared from γ-alumina normally has a particle size of greater than 100 nm.

To make nanosized α-alumina, e.g., α-alumina particles of less than about 100 nm, has been a challenge for an extended period of time. To prevent the particle from rapid grain growth is the key. It is well known that fine α-alumina powders having an average particle size of greater than 100 nm can be prepared via a seeded sol-gel-process. In the process, boehmite is first peptized in acidic aqueous solution, containing nitric acid or acetic acid and then a couple of weight percent of α-alumina seeds, usually fine α-alumina particles, are added to the solution during the peptization to allow phase transformation to occur at lower temperature. The sol is oven dried at about 100° C. and converted to a dry gel. After crushing to micron sized granules, they are fired at a high temperature, normally over about 1000° C. to the produce of α-alumina particles. The temperature must be well controlled to prevent particle growth. However, in this process micron sized grains remain intact during the phase transformation process and result in mechanically strong hard grains of α-alumina after completion of the transformation. To make nanoalumina particles, high mechanical energy is required to crush or break down the grain into primary particles which typically have an average particle size of more than 100 nm. Moreover, the grinding process frequently results in high levels of impurity contamination.

U.S. Pat. No. 5,312,791 recites a modified approach to prepare alumina grains and fibers. The starting material is boehmite that is peptized and then dispersed in water to generate an alumina sol. The sol is rapidly cooled in liquid nitrogen or, alternatively slowly cooled by freeze drying. Water is sublimed under vacuum from the sol to form a gel composed of flakes having a thickness of between 1 and 3 µm. By the process recited in '791 patent, finer aluminal powders, flakes, fibers, and grains can be made having micron-sized smallest dimensions. However, as the powders themselves have no porosity, they require high mechanical energy grinding to form smaller particles which introduces high levels of impurities into the α-alumina product.

Methods of making α-alumina particles or grains using Seeded Gel (SG) technology via controlled solution chemistry has been known for several decades. Typically the process includes peptization of boehmite powder (AlOOH) in water by the addition of an acid, such as nitric acid, hydrochloric acid, or acetic acid, to form a uniform boehmite sol. Alumina seeds which are frequently fine α-alumina particles, which have been dispersed in water, are added to the boehmite sol and the admixture is combined thoroughly. The sol solution is then subjected to a drying process to transform the sol into a dried gel which is then pulverized and fired to a temperature at which point transformation to α-alumina is completed with minimal sintering. Because of the presence of the seed particles, transformation temperature is decreased from about 1200 to about 1250° C. for unseeded sols to about 1000 to about 1050° C. The α-alumina thus prepared can have sub micron particle sizes. However, no α-alumina particles prepared to date have an average particle size of less than about 100 nm.

SUMMARY OF THE INVENTION

This invention provides a technique to make stable nanosized α-alumina particles. The invention further provides nanosized α-alumina powders and slurries comprising same which comprise no or very little chemical additives for suspension stability. The slurry of the invention provides a high material removal rates on silicon dioxide ($SiO_2$) and further provides very good surface finishing. The method of manufacture of the nanosized α-alumina powders of the invention comprise seeding with nanosized α-alumina seed particles and firing the seeded alumina gel at reduced temperatures.

The present invention provides an α-alumina powder comprising α-alumina particles of which at least 80% of the particles have a particle size of less than 100 nm. The invention further provides slurries comprising at least one α-alumina powder of the invention. That is, the invention provides a slurry comprising α-alumina particles of which at least 80% of the α-alumina particles have a particle size of less than 100 nm.

The invention also provides a process for the producing the α-alumina particles and powders of the invention. The process comprises the steps of:

providing a gel comprising at least one alumina precursor and a plurality of α-alumina seed particles;

drying the gel;

firing the dried gel at a temperature capable of inducing α-alumina formation without causing particle size growth.

In yet another embodiment, the invention provides polishing methods which include the use of α-alumina powders and slurries as a polishing agent. The polishing method comprises the steps of:

providing slurry comprising α-alumina particles of which at least 80% of the α-alumina particles have a particle size of less than 100 nm; and applying the slurry to an interface between the substrate and a polishing pad.

Other aspects and embodiments of the invention are discussed below.

DETAILED DESCRIPTION OF THE INVENTION

Figure 1:
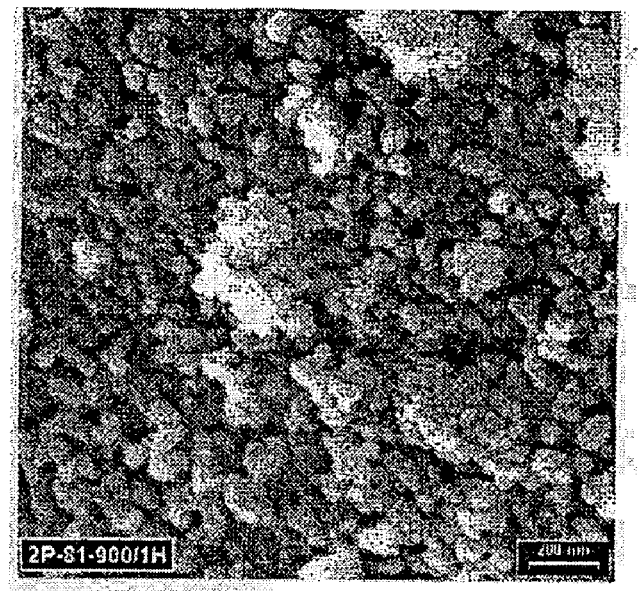
FIG. 1 is a micrograph of α-alumina particles of the invention prepared from aluminum nitrate and 10% α-alumina seeds by weight and fired at 900° C. for 1 hour (200 nm scale bar)

The α-alumina particles and slurries comprising same provided by the present invention are suitable for use in various applications including, for example, polishing, CMP applications, catalyst support materials, and the like. The α-alumina particles and slurries are particularly suited for use in polishing and CMP applications because α-alumina particles of the invention possess exceptional hardness and have an average particle size of between 10 nm and about 100 nm. Moreover, the α-alumina particles of the invention offer high material removal rates with minimal substrate defectivity.

The present invention provides α-alumina powders in which at least 80% of the α-alumina particles of the powder have a particle size of less than 100 nm. The present invention further provides slurries comprising at least one α-alumina powder of the invention. Preferably, about 90% of the α-alumina particles in the powders or slurries of the invention have a size of between about 10 nm and about 100 nm. More preferably about 99% of the α-alumina particles in the powders or slurries of the invention have a size of between about 10 nm and about 100 nm. In particularly preferred embodiments of the invention, about 99% of the α-alumina particles in the powders or slurries of the invention have a size of between about 25 nm and about 80 run, or between about 30 nm and about 70 nm.

In other preferred embodiments, the invention provides α-alumina powders which comprise α-alumina particles having at least 99% of the particles within a size distribution of about 10 nm.

Other preferred slurries of the invention comprise one or more α-alumina particles of the present invention. That is, slurries of the invention can comprise a single particle size of α-alumina or a composite mixture of two or more particles sizes having different average particle sizes which when mixed combine to form a mono-modal, bi-modal, or poly-modal particle size distribution. Typically slurries comprising α-alumina particles having a single average particle size distribution are preferred.

Preferred slurries of the invention comprise one or more α-alumina particles of the invention. Preferred α-alumina particles include any α-alumina particle described herein. More preferred slurries include those slurries in which the α-alumina particles are dispersed in an aqueous mixture. Preferred aqueous mixtures include water, particularly deionized or distilled water, aqueous solutions comprising one or more surfactants, organic acids, or other additives. Preferred additives are chemically inert to α-alumina under storage or polishing conditions. Additionally preferred additives are capable of inhibiting aggregation of α-alumina particles in an aqueous mixture. Particularly preferred additives to the aqueous mixture include organic acids such as acetic acid, formic acid, lactic acid, glycolic acid, citric acid, oxalic acid, and other carboxylic acids having less than about 6 carbon atoms.

Aqueous slurries of the present invention typically have a pH of between about 2 and about 11. In certain preferred applications, slurries having an acidic pH or an alkaline pH are desirable. Thus more preferred aqueous slurries of the invention have a pH of from about 1 or 2 to about 6 or between about 8 and about 10.5.

The slurries of the invention are suitable for use in a variety of applications including use as abrasives in polishing or CMP applications, as supports for metal catalysts and the like.

In the process of the invention, aluminum chemicals are used as the α-alumina precursor, e.g. molecular alumina precursors are utilized instead of boehmite. The aluminum compounds can be inorganic (Aluminum nitrate, aluminum chloride, aluminum sulfate, and the like) or organic (aluminum alkoxides, aluminum acetate, and the like). Preferably, the inorganic or organic aluminum compounds which are utilized as molecular alumina precursors are water soluble.

In preferred embodiments, a process for the production of α-alumina particles is provided which comprises the steps of providing a gel comprising at least one alumina precursor and a plurality of α-alumina seed particles;

drying the gel;

firing the dried gel at a temperature capable of inducing α-alumina formation without causing particle size growth.

It is generally desirable to have the seed particles substantially homogeneously dispersed throughout the gel to insure efficient seeding of the gel during firing.

In particularly preferred processes of the invention, the gel, which comprises at least one alumina precursor and a plurality of α-alumina seed particles, is prepared by the process comprising the steps of:

providing an aqueous solution of at least one molecular alumina precursor which has α-alumina seed particles dispersed therein concentrating the aqueous solution to form a gel having the α-alumina seed particles dispersed therein.

In preferred embodiments, the firing step is carried out a temperature which is sufficient to transform the gel to the α-alumina phase but is insufficient to induce sintering of the gel or an increase in individual particle size. Typically preferred processes of the invention comprise a firing step conducted at a temperature of less than about 1050° C. or more preferably at a temperature of less than about 950° C. In particularly preferred processes of the invention the firing is conducted at a temperature of between about 750° C. and about 950° C. or between about 800° C. and about 900° C.

Although any water soluble organic or inorganic coordination complex or salt of aluminum may be suitable for use in the processes of the invention, preferred molecular alumina precursors are selected from aluminum salts comprising one or more anions selected from alkoxides, aryl oxides, carboxylates, halides, sulphate, nitrate, oxalates, and acetoacetonates. Particularly preferred molecular alumina precursors include aluminum alkoxides, carboxylates, halides and nitrates.

Preferred aqueous solutions provided or prepared by the processes of the invention comprise water, at least one molecular alumina precursor, at least one acid, and α-alumina seed particles. Preferred acids are selected from the group consisting of nitric acid, sulfuric acid, hydrochloric acid, hydrobromic acid, hydroiodic acid, acetic acid, formic acid, propionic acid and the like.

At present no uniform α-alumina particles having an average particle size of less than 125 nm or less than 100 nm are available for use as seeds in the methods of making nanosized α-alumina particles of the invention. Thus, an iterative process is typically undertaken whereby initial nanosized α-alumina particles are prepared by using slightly larger seed α-alumina particles to form a product α-alumina comprising nanosized α-alumina having a particle size of less than 100 nm and seed particles having a particle size of about 125 nm or more (typically about 1 to about 5 or 10 weight percent of the product α-alumina particles are seed particles). Repeatedly using product nanosized α-alumina particles as the seed α-alumina particles in future production runs reduces the concentration of larger α-alumina particles. For example, at a five (5) weight percent loading of seed particles, after four production runs the concentration of original α-alumina particle seeds, e.g., particles of greater than about 125 nm, is about 6 ppm. The concentration of larger α-alumina particles will continue to decrease until α-alumina particles with substantially uniform particle sizes are obtained.

In preferred aqueous solutions, the α-alumina seed particles have an average particle size of less than about 125 nm, or more preferably less than about 100 nm. Particularly preferred seed particles have an average particle size of between about 30 nm and about 100 mm, between about 40 nm and about 80 nm, or between about 50 nm and about 70 nm.

Seed α-alumina particles are well dispersed in water and then the aluminum compounds are added to the water dispersion of the seed particles. It is desirable to increase the seeding efficacy of the water dispersion. Thus the concentration of the seeds is relatively high to increase the seeding power of the solution, e.g., the ratio of aluminum atoms in the product α-alumina particles originating in the seed versus the molecular alumina precursor is typically between about 1:3 and about 1:1000 or more preferably between about 1:6 and about 1:20. In preferred embodiments, the seed particles comprise between about 0.1 and about 15 weight percent of the product α-alumina powder. In particularly preferred embodiments the concentration of the seeds is about 1 and 10% by weight of the product α-alumina.

Applicants have discovered that the use of smaller seed particles typically result in a gel having a lower transformation temperature and product α-alumina powders comprising smaller particles. Moreover, smaller seed particles typically possess greater seeding power, e.g., fewer seeds are needed to induce crystal formation or phase transformation to α-alumina. I The pH of the dispersion of seed α-alumina particles before addition of the molecular alumina precursor is typically between 6 and 7. After solvation of the molecular alumina precursor, the pH of the dispersion frequently drops to less than about 2 or even to less than about 1. The dispersion can be optionally heated or aged at elevated temperature, e.g., greater than 90° C., to evaporate water. Typically the concentration step, e.g., heating and/or aging of the dispersion, is conducted with mechanical mixing to prevent deposition of the seed particles. After the viscosity of the dispersion is sufficient to prevent seed particle deposition, the dispersion is cooled to room temperature to form the gel. The gel can then be fired in air at a temperature of less than about 1050° C. or more preferably between about 800° C. and about 900° C. to transform the alumina gel to α-alumina.

Typically alkaline chemicals such as ammonia can be added to the above solution before aging and/or concentration of the solution. Although not wishing to be bound by theory, the addition of an alkaline additive such as ammonia or urea is necessary to initiate gel formation. However, the rate and quantity of alkaline added to the solution must be carefully regulated because addition of excess alkaline can induce formation of Bayerite. Preferably the alkaline chemical(s) are gradually added to the dispersion to facilitate hydrolysis at an elevated temperature, e.g., about 70° C. Hydrolysis with ammonia typically results in the formation of boehmite.

In general, when ammonia and other basic additives are preferably used in conjunction with aluminum salt precursors. However when alkaline chemicals such as ammonia are added to the dispersion it is necessary to control the pH of the dispersion because bayerite ($Al(OH)_3$) formation is possible at a pH greater than about 5. After addition of ammonia and resultant increase in pH, the dispersion becomes increasingly viscous and finally forms a gel. Preferably the pH of the reaction is maintained at a pH of between about 4 and about 4.5 during the gelation process. The gel is then subjected to firing to transform the gel to α-alumina as discussed supra.

Applicants have surprisingly discovered that substitution of urea for ammonia as the alkaline chemical facilitating hydrolysis permits reduced firing temperatures. Typically, when urea is used as the alkaline chemical additive, hydrolysis is carried out at a temperature of more than 90° C. The alumina gel formed by the process using urea may be fired to transform to α-alumina at reduced firing temperatures, e.g., at a temperature of about 800° C.

In another embodiment, gel formation using one or more aluminum alkoxides as the molecular alumina precursor required an aqueous hydrolysis at an elevated temperature and further frequently requires the addition of an acid catalyst such as hydrochloric acid or nitric acid. The aluminum alkoxide precursor can be solvated in an anhydrous alcohol and then mixed with an aqueous dispersion of the seed particles or alternatively the aluminum alkoxide may be directly solvated in the aqueous dispersion of seed crystals. Acid added to the aqueous dispersion catalyzes the hydrolysis of the aluminum alkoxide and further facilitates peptization of the dispersion. The sol is kept stirring at an elevated temperature until it is sufficiently viscous to prevent sedimentation of the seed particles.

Hydrolysis of the aluminum alkoxide can be conduced at either room temperature or at an elevate temperature. When the hydrolysis is carried out at room temperature, the resultant sol is amorphous, e.g., a pseudo boehmite solution with an alcohol layer on top of an aqueous phase. Preferably the hydrolysis is carried out at a temperature sufficient to complete the hydrolysis within about 24 hours. Typically preferred hydrolysis reactions are carried out at a temperature of between about 50° C. and about 90° C. Alcohol is removed by evaporation from the reaction mixture. Typically, it is preferably to have a rapid rate of hydrolysis in order to minimize seed particle aggregation.

Alternatively, when hydrolysis is carried out at an elevated temperature, e.g., about 50° C. to about 80° C. The product produced by carrying out hydrolysis at room temperature is substantially the same as the product formed at elevated temperature but the rate of hydrolysis is typically too slow to be practical.

Firing of gels prepared from sols of hydrolyzed aluminum alkoxide precurors provides α-alumina particles at a temperature of between about 800 to about 850° C.

The present invention provides new processes of preparing α-alumina particles which comprise firing of a precursor gel at a temperature of between about 750° C. and about 950° C. or more preferably between about 800° C. and about 900° C. depending upon the molecular alumina precursor. The low transformation temperatures for formation of α-alumina are desirable and advantageous, in part because they prevent particle growth during firing and excessive necking of particles, e.g., particle sintering. Applicants have surprisingly discovered that substantially uniform dispersion of nanosized α-alumina seed particles throughout the sol, the seeding power is maximized thereby reducing the transformation temperature.

A comparison study on a boehmite, P2K of Condea, with the same alumina seeds, same concentration (10%) showed that P2K requires much higher temperature for the phase transformation. When fired at 900° C. for 1 hour only about 40% of $\alpha\text{-}Al_2O_3$ is formed form the P2K material in comparison to about 100% of $\alpha\text{-}Al_2O_3$ from the process of the invention.

Figure 2:
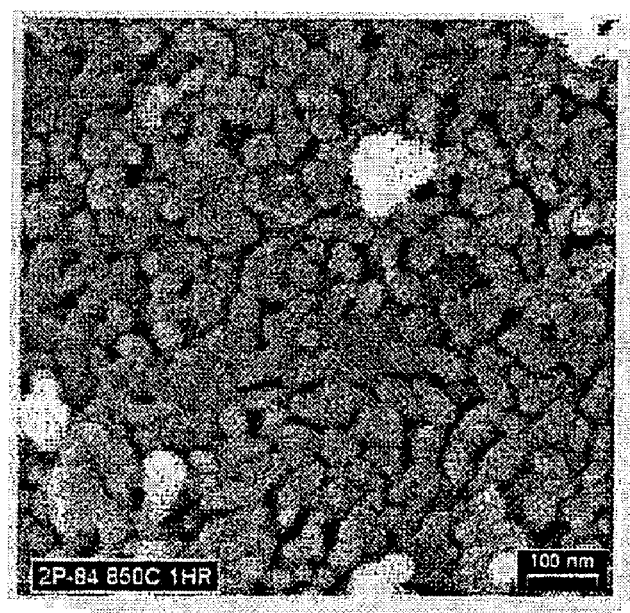
FIG. 2 is a micrograph of α-alumina particles of the invention prepared from aluminum sec-butoxide and 10% α-alumina seeds by weight and fired at 850° C. for 1 hour (100 nm scale bar).

SEM shows that the crystallite (or primary particle) size for the powder made from the chemical is definitely around about 50 nm (See FIGS. 1 and 2). Though the aprticles are slightly agglomerated and necked, the SSA is 39 $m^2/g$ for a sample fired at 900° C. for 1 hour. In comparison, α-alumina prepared from P2K under the same firing conditions results in about α-alumina particles having an average particle size of about 100 nm and a SSA of less than 24 $m^2/g$.

The α-alumina particles, α-alumina powders, and α-alumina slurries of the present invention provide a very pure form of $\alpha\text{-}Al_2O_3$. No dopants, sodium, silicon dioxide or the like are utilized during the production process. Moreover, the milling of the fired gel to generate the α-alumina particles having an average particle size of less than 100 nm is facile resulting in minimal contamination from the milling process.

EXAMPLE 1

Polycrystalline α-alumina particles were dispersed in water by high energy attrition milling using high purity alumina media as the milling media. The slurry such prepared was used as seeds (27.5%) for the following processing for nanosized alumina. 42.5 g of the seeds slurry was mixed with 2130 g of DI water and 62.3 g of nitric acid (~70%) under vigorous stirring using a mixer. To the solution, 577 g of commercial aluminum sec-butoxide was added and stirred for 2 hours at room temperature. The solution was further heated up to temperature 80C under vigorous stirring and maintained at the temperature until gelation taked place. The gel was transferred to a stainless container and dried in an oven at 80C. The dried gel was fired in a box furnace at 880C for 1 hour and cooled down to room temperature. The fired material was confirmed to be ~98% α-alumina powder on X-ray diffraction and He density measurement. SEM showed that the primary particle is 40-60 nm in size. The fired powder was charged into the same attrition miller with water and milled for 6 hours using the alumina milling media. The size distribution of the milled slurry measured by a dynamic Horiba particle size analyzer and gave a D50=76 nm.

EXAMPLE 2

127.5 g of the same α-alumina seeds as in Example 1 was mixed with 6350 g of water and 561.5 g of HCl (35%) in a Teflon lined stainless container. On the other hand, 1730 g of aluminum butoxide was mixed with 5100 g of anhydrous ethanol in a glass container. The two solutions were further mixed in the Teflon lined stainless container and stirred vigorously on a hotplate. The solution was heated up to 80C slowly and maintained at the temperature until the solution becomes viscous. The gel-like material is transferred to a stainless pan and dried in a drying oven. The dried material was fired at 820C for 1 hour in a box furnace. The fired powder was confirmed to be ~98% of α-alumina based on X-ray and He-density measurements, with surface area of the powder being 45 m2/g. SEM shows that the primary particles are 40-60 nm in size. The powder was dispersed in DI water and charged in an attrition miller and milled for 6 hours. The milled particles had a D50~75 nm, based on a dynamic particle size analyzer.

EXAMPLE 3

120 g of the alfa-alumina seeds, as same as in Example 1, was dispersed in 5000 g of DI water, to which 3000 g of hydrous aluminum nitrate was added. The solution was heated on a hotplate to temperature 75C. 1540 g of ammonium hydroxide (28-30%) was drop wise added to the solution under vigorous stirring. The solution was stirred at the temperature until it became too viscous to stir. After dried in an oven, the gel-like material was first fired at 500C to remove the NOx and then fired at 880C to complete the transformation to alfa-alumina. The fired powder was confirmed to be ~95% alfa-alumina based on X-ray diffraction and He-density measurement. The specific surface area was 38 m2/g from a BET measurment. On SEM, the primary particles are 50-70 nm in size. The fired powder was mixed with DI water and milled in an attrition miller using a high purity alumina media. The milled slurry gave a D50~75 nm, from on a dynamic particle size analyzer.

EXAMPLE 4

120 g of alfa-alumina seeds, 27.5% by solids same as in Example 1, was mixed with 5000 g of DI water, to which 3000 g of hydrous aluminum nitrate, Al(NO3)3.9H2O was added. The solution was vigorously stirred using a mixer and gradually heated on hot plate to a temperature of 85C. The solution was kept stirring at the temperature to evaporate the water until solidification occurred. The material was cooled down to room temperature, and then fired at 500C to remove NOx. The pre-fired powder was then fired at 880C in a box furnace to complete the transformation to alfa-alumina, which was confirmed as in Examples 1-3. The fired alumina powder was milled using an attrition miller for 6 hours.

Although a number of embodiments of the present invention have been described, it will become obvious to those of ordinary skill in the art that other embodiments to and/or modifications, combinations, and substitutions of the present invention are possible, all of which are within the scope and spirit of the disclosed invention.

What is claimed is:

1. A slurry comprising α-alumina particles of which at least 80% of the α-alumina particles have a particle size of less than 100 nm and about 99% of the α-alumina particles are within a size distribution of about 10 nm, wherein the particles are not produced with silica, and the pH of the slurry is between about 1 and about 6.

2. The slurry of claim 1, wherein about 90% of the α-alumina particles have a size of between about 10 nm and about 100 nm.

3. The slurry of claim 1, wherein about 99% of the α-alumina particles have a size of between about 10 nm and about 100 nm.

4. The slurry of claim 1, wherein about 99% of the α-alumina particles have a size of between about 25 nm and about 80nm.

5. The slurry of claim 1 wherein about 99% of the α-alumina particles have a size of between about 30 nm and about 70 nm.

6. The slurry of claim 1, further comprising water.

7. The slurry of claim 1, further comprising deionized water.

8. The slurry of claim 1, further comprising one or more additives.

9. The slurry of claim 8, wherein the additives are chemically inert to α-alumina under storage conditions or polishing conditions.

10. The slurry of claim 8, wherein the additives inhibit aggregation of α-alumina particles under storage conditions or polishing conditions.

11. The slurry of claim 8, wherein the additive is selected from organic acids.

12. The slurry of claim 11, wherein the additive is selected from acetic acid, formic add, lactic acid, and citric acid.

13. The slurry of claim 11 wherein one or more dopants or sodium are not utilized during production of the particles.

14. A process for the production of a slurry composition which comprises α-alumina particles, the process comprising:
    providing a gel comprising at least one alumina precursor and a plurality of α-alumina seed particles;
    drying the gel;
    firing the dried gel at a temperature capable of inducing α-alumina formation without causing particle size growth to provide α-alumina particles of which at (east 99% of the α-alumina particles have a particle size of less than 100 nm, wherein 99% of the α-alumina oatticles are within a size distribution of about 10 nm. and wherein the particles are not produced with silica; and
    admixing the α-alumina particles with water to provide a slurry composition for chemical-mechanical polishing, the pH of the slurry being between about 1 and about 6.

15. The process of claim 14, wherein the gel comprising at least one alumina precursor and a plurality of α-alumina seed particles is prepared by the process comprising the steps of:
    providing an aqueous solution of at least one molecular alumina precursor which has α-alumina seed particles dispersed therein
    concentrating the aqueous solution to form a gel having the α-alumina seed particles dispersed Therein.

16. The process of claim 15, wherein the α-alumina seed particles are homogeneously dispersed in the gel.

17. The process of claim 15, wherein the molecular alumina precursor is selected from aluminum salts comprising one or more anions selected from alkoxides, aryl oxides, carboxylates, halides, sulphate, nitrate, oxalates, and acetoacetonates.

18. The process of claim 15, wherein the molecular alumina precursor comprises one or more anions selected from alkoxides, carboxylates, halides and nitrate.

19. The process of claim 15, wherein the α-alumina seed particles have an average particle size of less than about 125 nm.

20. The process of claim 15, wherein the aqueous solution comprises water, at least one molecular alumina precursor, at least one acid, and α-alumina seed particles.

21. The process of claim 20, wherein the acid is selected from the group consisting of nitric acid, sulfuric acid, hydrochloric acid, hydrobromic acid, hydrolodic acid, acetic acid, formic acid, propionic acid, and citric acid.

22. The process of claim 14, wherein the firing is conducted at a temperature of less than about 1050° C.

23. The process of claim 14, wherein the firing is conducted at a temperature of less than about 950 ° C.

24. The process of claim 14, wherein the firing is conducted at a temperature of between about 750° C. and about 950° C.

25. The process of claim 14, wherein the firing is conducted at a temperature of between about 800° C. and about 900° C.

26. The process of claim 14, wherein the α-alumina seed particles have an average particle size of less than about 125 nm.

27. The process of claim 14, wherein the α-alumina seed particles have an average particle size of less than about 100 nm.

28. The process of claim 14, wherein the α-alumina seed particles have an average particle size of between about 30 nm and about 100 nm.

29. The process of claim 14, wherein the α-alumina seed particles have an average particle size of between about 40 nm and about 80nm.

30. The process of claim 14, wherein the α-alumina seed particles have en average particle size of between about 50 nm and about 70 nm.

31. The process of claim 14, wherein the ratio of α-alumina seed particles to molecular alumina precursor is between about 1:2 and about 1:1000 based on the ratio of aluminum atoms in the seed particles and precursor.

32. The process of claim 31, wherein the ratio of α-alumina seed particles to molecular alumina precursor is between about 1:6 and about 1:20.

33. The process of claim 14 wherein one or more dopants or sodium are not utilized during production of the particles.

34. A slurry comprising α-alumina particles of which at least 99% of the α-alumina particles have a particle size of less than 100 nm wherein about 99% of the alpha alumina particles are within a size distribution of about 10 nm and wherein the particles are not produced with silica, and the pH of the slurry is between about 1 and about 6.

35. A process for the production of a slurry composition which comprises α-alumina particles, the process comprising:
    providing a gel comprising at least one alumina precursor and a plurality of α-alumina seed particles;
    drying the gel;
    firing the dried gel at a temperature capable of inducing α-alumina formation without causing particle size growth to provide α-alumina particles having a particle size of less than 100 nm, wherein about 99% of the α-alumina particles are within a size distribution of about 10 nm, and wherein the particles are not produced with silica; and
    admixing the α-alumina particles with water to provide a slurry composition for chemical-mechanicspolishing, the pH of the slurry being between about 1 and about 6.

* * * * *